F. W. NALLEY.
EGG HANDLING DEVICE.
APPLICATION FILED MAR. 9, 1915.

1,184,372.

Patented May 23, 1916.
2 SHEETS—SHEET 1.

Witnesses:

Inventor
F. W. Nalley.
By
Attorney

F. W. NALLEY.
EGG HANDLING DEVICE.
APPLICATION FILED MAR. 9, 1915.
1,184,372.
Patented May 23, 1916.
2 SHEETS—SHEET 2.
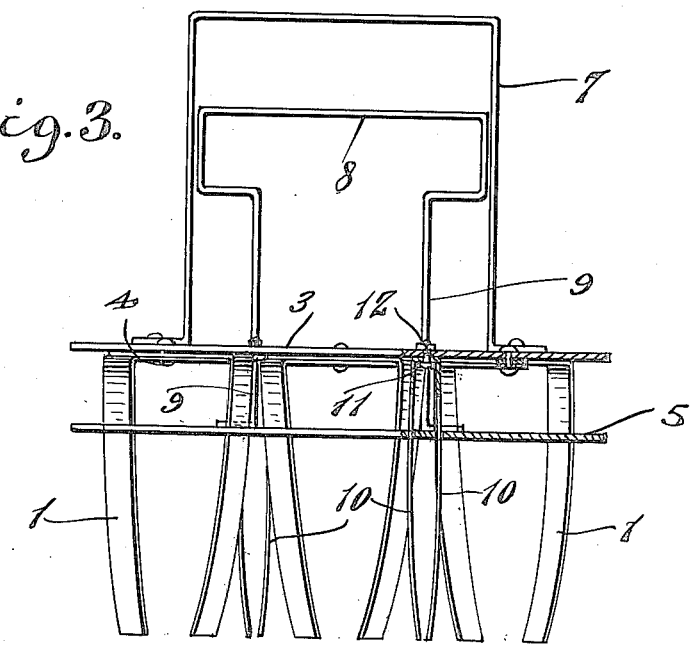
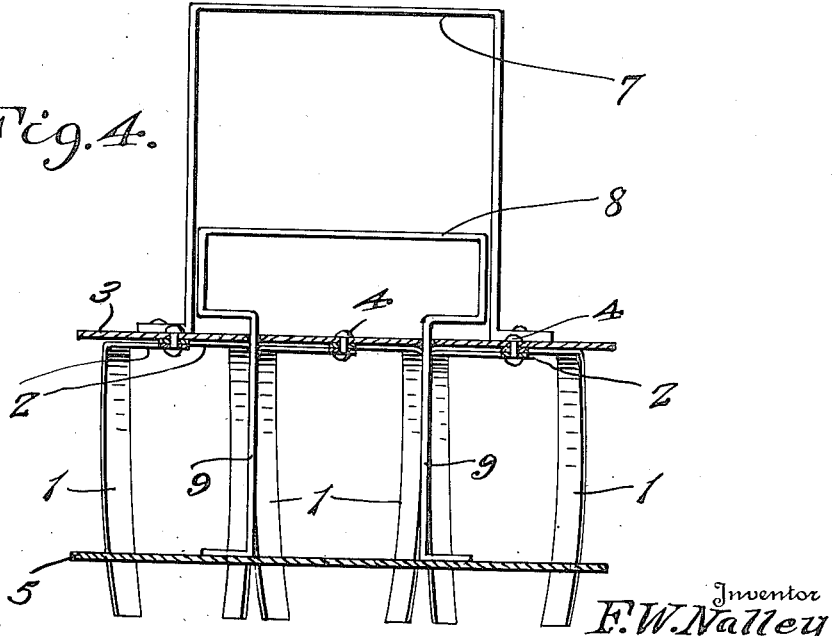

UNITED STATES PATENT OFFICE.

FRANK W. NALLEY, OF LEAF RIVER, ILLINOIS.

EGG-HANDLING DEVICE.

1,184,372.  Specification of Letters Patent.  Patented May 23, 1916.

Application filed March 9, 1915. Serial No. 13,266.

*To all whom it may concern:*

Be it known that I, FRANK W. NALLEY, a citizen of the United States, residing at Leaf River, in the county of Ogle and State of Illinois, have invented certain new and useful Improvements in Egg-Handling Devices; and I do hereby declare the following to be a full, clear, and exact description of the invention, such as will enable others skilled in the art to which it appertains to make and use the same.

The invention relates to improvements in egg handling devices.

The object of the present invention is to improve the construction of egg handling devices and to provide a simple, practical, and inexpensive egg handling device designed principally for removing eggs from one crate to another and adapted to enable the eggs to be rapidly transferred from one crate to the other, with or without the egg filler thereby obviating the necessitating of handling the eggs one at time.

A further object of the invention is to provide an egg handling device of this character equipped with means for engaging and lifting the eggs without liability of cracking or otherwise injuring the same and adapted to be readily operated to deposit the eggs gently without breaking them.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

Figure 1:
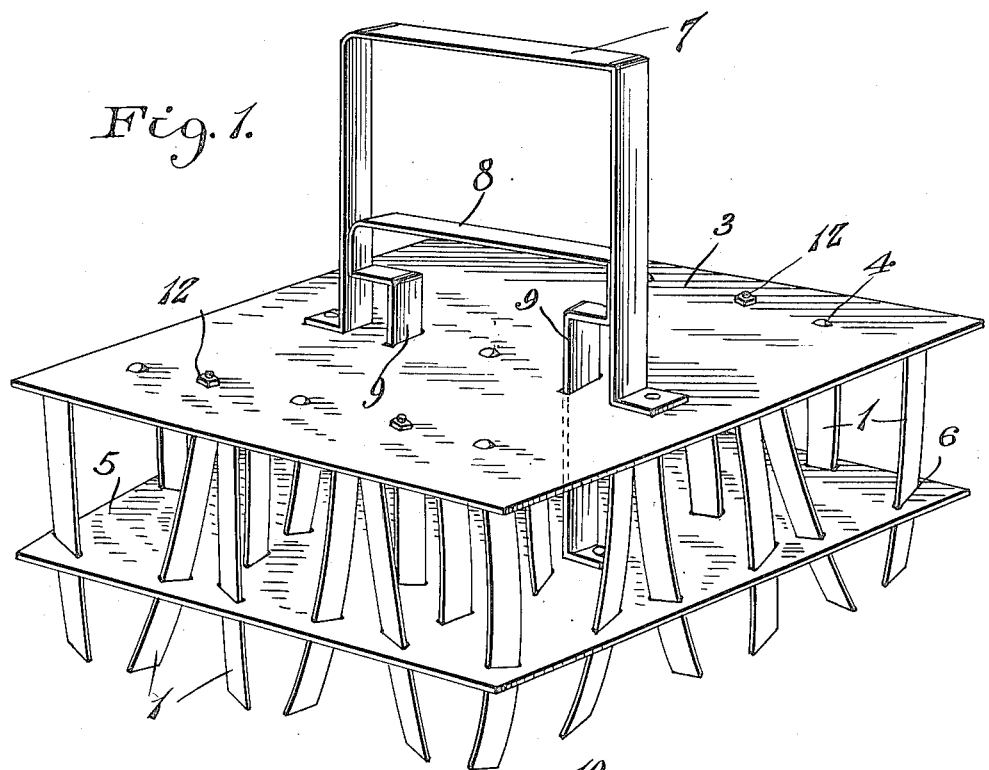
Figure 2:
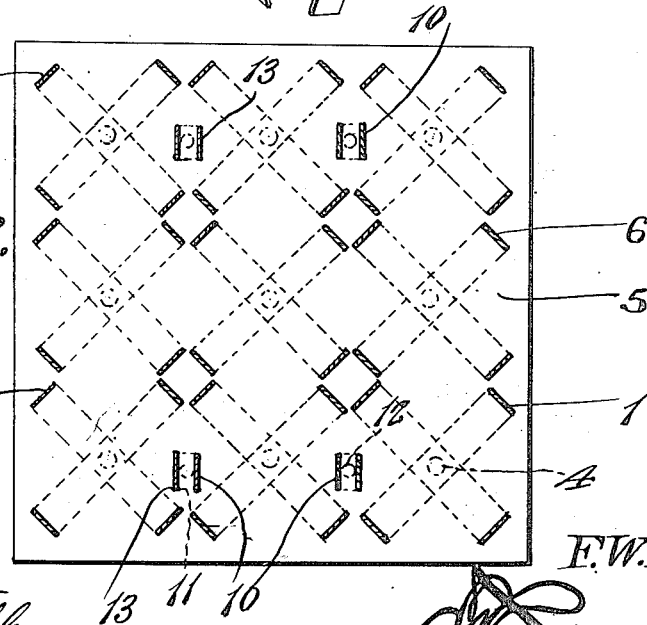

In the drawings Figure 1 is a perspective view of an egg handling device constructed in accordance with this invention, Fig. 2 is a horizontal sectional view of the same illustrating the construction of the lower plate, Fig. 3 is a vertical sectional view of the egg handling device, the egg engaging fingers and the filler engaging fingers being closed, Fig. 4 is a similar view, the egg and filler engaging fingers being open.

Like numerals of reference designate corresponding parts in all the figures of the drawings.

In the accompanying drawings in which is illustrated the preferred embodiment of the invention, the egg handling device comprises in its construction resilient egg engaging fingers 1 arranged in sets of two pairs with the members of each pair of fingers constructed of a single piece of spring metal, preferably spring steel and provided with a top connecting portion. The connecting portion of the pairs of each set of egg engaging fingers are secured to an upper plate 3 by suitable fastening devices 4. The top connecting portions 2 of the egg engaging fingers are fitted against the lower face of the plate 3 and while for convenience of illustration the egg handling device is constructed for engaging nine eggs it may be made of any desired size, a three dozen size being designed to be employed when the device is used for transferring eggs from one crate to another. While this is the principal object of the invention, the device may be conveniently employed for removing the eggs from crates when selling the eggs and the devices may then be constructed for removing a dozen or a half dozen of eggs.

The resilient egg engaging fingers are curved downwardly and inwardly and are adapted to fit around and securely embrace an egg with sufficient pressure to lift the same and enable the eggs to be carried and handled without liability of dropping them. The fingers are spread or opened to enable them to be readily engaged with the egg by means of a lower plate 5 constructed of sheet metal or other suitable material and provided with slots 6 through which the resilient fingers 1 pass. The slots are arranged in sets and are spaced apart a sufficient distance to enable the lower terminals of the resilient fingers to be passed over the eggs and when the plate 5 is raised the resilient fingers gradually close on the eggs.

The egg handling device is operated by means of handles 7 and 8 preferably consisting of rigid bails arranged one within the other and secured to the upper and lower plates 3 and 5. Each handle consists of spaced sides and a connecting grip portion and the upper plate 3 is provided with opposite slots 9 through which pass the sides of the handle 8 of the lower plate 5.

The handles are adapted to be simultaneously grasped by the operator who pushes downward on the inner handle 8 and draws upwardly on the outer handle 7 to open the resilient fingers 1. The grip portions of the handles 7 and 8 are drawn together in releasing the fingers to permit the same to close around the eggs. The egg handling device may be equipped with fingers 10 constructed of spring steel or other suitable material and arranged in pairs and at suitable points for engaging the egg filler so that the eggs and the filler may be simultaneously removed from a crate when desired. The members of each pair of the fingers 10 are constructed of a single piece of metal and are connected by a top portion 11 which is detachably secured to the lower face of the upper plate by a suitable fastening device 12. This will enable the filler engaging fingers to be removed when it is not desired to use them. The lower relatively movable plate 5 is provided with slots 13 through which pass the fingers 10 and the latter are spread to enable them to pass over and engage the fillers.

It will be seen that the egg handling device is exceedingly simple in construction and easily operated; the inner and outer handles or bails may be readily moved in opposite directions to open the resilient filler engaging fingers and that the fingers are permitted to close and engage the eggs and fillers by a single grasp upon the two handles with one hand.

What is claimed is:—

1. An egg handling device comprising a supporting plate having a handle, a plurality of sets of resilient fingers carried by and depending from the said supporting plate, a lower spreading plate movable toward and from the supporting plate and provided with openings receiving the fingers and adapted to cause the same to open and close, a handle for the lower plate arranged to be grasped simultaneously with the upper handle and guiding means fixed to one of the plates and slidably received in the other plate.

2. An egg handling device comprising an upper plate, resilient egg engaging fingers depending from the support and arranged in sets, a lower plate provided with slots receiving the fingers and movable toward and from the upper plate to permit the fingers to open and close, guiding means fixed to one of the plates and slidably received in the other plate and handles connected with the plates and arranged adjacent to each other for simultaneous operation.

3. An egg handling device comprising an upper supporting plate, resilient egg engaging fingers depending from the plate and arranged in sets, a lower plate provided with slots receiving the fingers and movable toward and from the upper plate to permit the fingers to open and close, and handles consisting of inner and outer relatively rigid bails connected with the said plates, the inner handle being slidable through the upper plate.

4. An egg handling device including a support provided with depending egg engaging fingers arranged in sets, filler engaging fingers arranged in pairs and depending from the said support and a relatively movable slotted plate receiving the said fingers and adapted to open and close the same.

In testimony whereof I affix my signature in presence of two witnesses.

FRANK W. NALLEY.

Witnesses:
ALVA C. BARBER,
JAS. F. HARRISON.